United States Patent
Boukobza (10) Patent No.: US 7,676,516 B2
(45) Date of Patent: Mar. 9, 2010

(54) SYSTEM AND METHOD FOR THE OPTIMIZATION OF DATABASE ACCESS IN DATA BASE NETWORKS

(75) Inventor: Eric Boukobza, Givataim (IL)

(73) Assignee: Active-Base Ltd., Ramat Gan (IL)

( * ) Notice: Subject to any disclaimer, the term of this patent is extended or adjusted under 35 U.S.C. 154(b) by 747 days.

(21) Appl. No.: 10/531,205

(22) PCT Filed: Oct. 19, 2003

(86) PCT No.: PCT/IL03/00848

§ 371 (c)(1),
(2), (4) Date: Apr. 14, 2005

(87) PCT Pub. No.: WO2004/036344

PCT Pub. Date: Apr. 29, 2004

(65) Prior Publication Data

US 2006/0167883 A1    Jul. 27, 2006

(51) Int. Cl.
*G06F 17/30* (2006.01)

(52) U.S. Cl. .................... 707/713; 707/674; 707/781

(58) Field of Classification Search .............. 707/1–10, 707/100, 202; 709/220, 223, 238; 718/105
See application file for complete search history.

(56) References Cited

U.S. PATENT DOCUMENTS

2003/0009507 A1*  1/2003  Shum ..................... 709/104

OTHER PUBLICATIONS

Duda, A. and Sheldon, M.A.; "Content Routing In A Network Of WAIS Servers", Distributed Computing Systems, Jun. 21-24, 1994, Proceedings of the 14th International, pp. 124-132.*

* cited by examiner

*Primary Examiner*—Cheryl Lewis
(74) *Attorney, Agent, or Firm*—Mark M. Friedman (57) ABSTRACT

A database network router (DNR) in a database network includes a client access module and a database resource manager that communicate with each other using a common software interface. The client access module communicates with clients including application servers and external database servers; and the database resource manager communicates with the database servers. The DNR also includes a protocol manager for handling multiple database protocols. The database network router also includes local data cache storage to store commonly used data objects, results of parsed query statement, non-optimized query statements, and optimized alternatives and assigns a priority to each client on log-in. The DNR provides a method for connections pooling, a method for balancing the load in a database networks and a method for synchronizing the data stored in cache memory with the database network and method for synchronizing the data stored in cache memory with the database to insure data reliability. The DNR also provides a method for monitoring and optimizing data queries to improve the performance of the database network. The DNR also provides a method to migrate from an old to a new version of the database.

21 Claims, 13 Drawing Sheets

FIG 7    Pooling, routing and prioritization

SYSTEM AND METHOD FOR THE OPTIMIZATION OF DATABASE ACCESS IN DATA BASE NETWORKS

FIELD AND BACKGROUND OF THE INVENTION

The present invention relates to data base networks and an improved method for the access of data and, more particularly, to optimization techniques for the flow of data, to improve the efficiency, reliability and quality of service in database networks.

Figure 1:
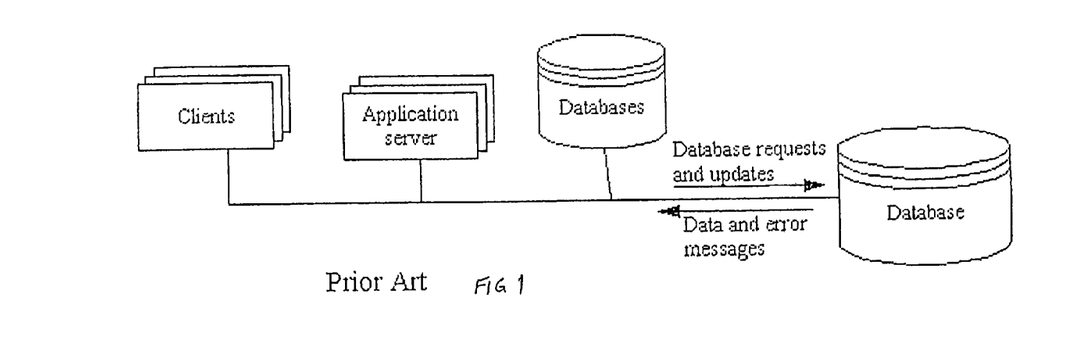
FIG. 1 is a schematic drawing of system according to a prior art database network.

One or more database servers serve a large number of clients. The term "clients" as used herein includes users, application servers and other databases. A schematic system diagram of a prior art database network is shown in FIG. 1.

In the normal operation of a database network, the clients establish a connection with the database server, and send database requests and database updates to the database server. The database server responds to the requests with data and error messages.

Commonly, there is a high processing load, including read/write load and high memory consumption on a database server, caused, for instance, by massive read requests from its clients. At these times, some or all of the clients wait for a long time in response to their data requests, because of limited database resources such as low availability of the database server central processing unit (CPU), low memory availability or a long queue waiting for a response in the database server read/write unit. The term "load" refers herein to any database server resource, typically time and memory and includes response time, read/write time and memory, an execution time and memory, and CPU time and memory.

Another inefficiency in the operation of current database server networks is related to the management of connections. Whenever a new client establishes or breaks a connection, a long database process is generated consuming CPU time, memory and read/write resources. A method which provides efficiently for the pooling of connections between users would increase database network efficiency.

A known cause of inefficiency in database networks is the use of database requests that are not executed using the most optimal execution steps. Inefficient execution of these database requests causes delay in the response to the client, high CPU consumption, high memory consumption or many read/write requests. Although algorithms are available that identify problematic database requests and suggest alternatives, these have not been applied in real time applications.

When several database servers are managed as a cluster, each client connection request is processed, using automatic selection, to one of the database servers in the cluster. Balance between connections is usually achieved when new connections are established, however, when there are several open connections, some of the database servers may become overloaded. These overloaded servers have limited performance and long response times.

Database servers are changed from time to time. When a database server is changed, applications that issue database requests may receive faster or slower response to their requests, and the load per request on the database changes from one version of the database to the other. The requests, that increase load, need to be identified and changed to receive faster response time from the database server and to consume fewer database resources.

There are some prior art applications which have attempted to address at least partially some of these known problems in database network servers.

Disk cache servers are intended to eliminate massive database access by keeping some data in memory. When the database server issues a disk request to retrieve cached data, the data are provided faster from the cache than from the storage medium. However, cache servers generally require that the application be aware of them since they do not guarantee synchronization between the cached data and the database.

There are application servers which provide a partial solution for central pooling of connections. However, they provide application pooling that requires customization of the database application. There are also special purpose applications using internal cache memory in the application.

There is thus a widely recognized need for the optimization of data flow in data base networks, and it would be highly advantageous to have a system and method for the optimization of database access in data base networks, and to improve the efficiency, reliability and quality of service in database networks

SUMMARY OF THE INVENTION

According to the present invention, there is provided a database network router for managing data flow between clients and database servers, including: (a) a client access module for communicating with a client: and (b) a database resource manager for communicating with multiple database servers; wherein the client access module and the database resource manager share a common software interface for communicating.

Preferably, the software interface of the database network router includes a protocol manager for handling multiple database protocols. Preferably, the database network router also includes local data storage for storing local data. Most preferably, the stored local data includes commonly used data objects, results of parsed query statements, non-optimized query statements, alternatives for non-optimized query statements, user defined objects and/or performance statistics. Preferably, a portion of the database resource manager is installed as a database server agent.

According to the present invention, there is provided a method of communicating in a database network, including the steps of: (a) receiving a client communication selected from the group consisting of database queries and updates, from a client; (b) sending at least one client communication to a database; and (c) in response to the client communication, sending at least one database communication, selected from the group consisting of database responses and data, to the at least one client.

Preferably, prior to receiving the client communication, a priority is assigned to the client communication and a database is allocated to the client communication. More preferably, before assigning priority, the client is identified and status information is received. The status information that is received includes a load of the database, a time of day of the assigning, a day of week of the assigning, a service level of the at least one client, and/or a status of at least one communications line between the client and the database.

Preferably, the at least one client communication includes a query. Prior to the sending of a query, at least one of the following is performed: analyzing the query, modifying the query, checking a cost estimate of the query, parsing the query; and storing the query in local storage. Optionally, modifying of the query includes a blocking of the query, and the at least one database communication is an error message.

According to the present invention, there is provided a method of connections pooling in a database network, including the steps of: (a) receiving a log-out and disconnect request from a first client that is initially connected to a database server of the database network by a database connection; and (b) reporting the log-out to the database server of the network while leaving the database connection available for a second client.

Preferably, the method also includes the steps of receiving a log-in and connection request from the second client, reporting the log-in to the database server and using the database connection for the second client. Preferably, the method also includes the step of, prior to the reporting step, responding to the first client log-out and disconnect request with a message confirming log-out and disconnect.

According to the present invention, there is provided a method of load balancing in a database network that includes a plurality of database servers, including the steps of: (a) detecting a failed one of the database servers; (b) transferring connections of the failed database server to at least one other server; and preferably, the method also includes, (c) monitoring the failed database server for a recovery thereof; and (d) transferring at least one new connection to the failed database after the recovery.

According to the present invention, there is provided a method of synchronizing data in a database network, including the steps of: (a) providing a database network router for mediating communications between at least one client and at least one database server of the database network; (b) receiving an updated data object from one of the at least one client of the database network; (c) waiting for a database server to report a successful update; and (d) upon receipt of the report allowing access to the updated data object.

According to the present invention, there is provided a method of optimizing data queries in a database network that includes a plurality of databases, including the steps of: (a) sending at least one query to one of the database servers; and (b) monitoring a processing of the at least one query by the one database server, the monitoring including receiving information, regarding the at least one query, chosen from the group consisting of (i) a CPU time of the database server, (ii) a response time of the database server, (iii) a read/write load of the database server, and (iv) an execution load of the database server.

Preferably, the method further includes, the step of storing the queries in a log of popular non-optimized queries, subsequent to the receiving step. More preferably, the method further includes the step of reading the queries from the log.

Preferably, the method also includes the step of analyzing and testing the queries. Preferably, the method also includes the step of building optimized alternatives for the queries.

According to the present invention there is provided a method of generating rules for migrating from an old database to a new database, including the steps of:

(a) monitoring at least one communication of at least one client, between at least one database network router and: (i) the old database, thereby providing first load results, and (ii) the new database, thereby providing second load results; and (b) comparing said first and second load results to identify which of the at least one communication, between the at least one database network router and the new database, requires tuning.

The present invention successfully addresses the shortcomings of the presently known database networks by providing a system and method for the optimization of the flow of data, to improve the efficiency, reliability and quality of service in database networks.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a database network router which optimizes data flow in a database network. Specifically, the present invention can be used for optimization, data caching, connection pooling, routing, load balancing, prioritization and migration to a new database, in a data base network.

The principles and operation of a database network router according to the present invention may be better understood with reference to the drawings and the accompanying description.

Figure 2:
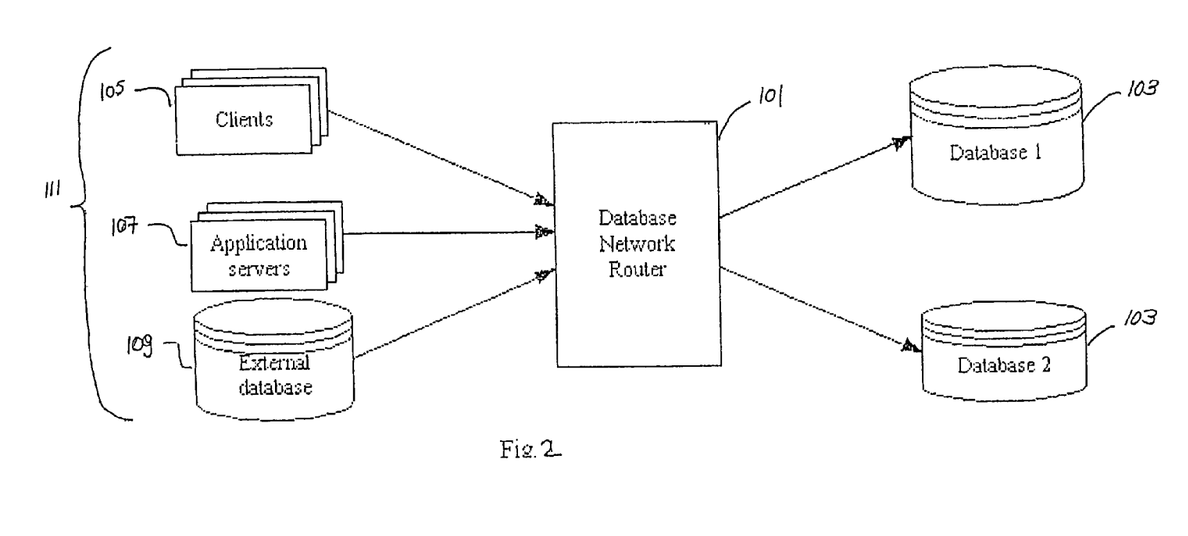
FIG. 2 is a schematic drawing of a system, according to the present invention, showing a database network router (DNR)

Referring now to the drawings, FIG. 2 illustrates a database network router 101 mediating the data flow between clients 105, application servers 107 and external database 109, on one side, to databases 103 on the other side; hereinafter "clients" 111 refers to all the users of the database network and includes application servers 107 and external databases 109 as well as clients 105. Database network router 101 (DNR) presents a software interface to clients 111 suitable to that of databases 103 and similarly DNR 101 presents a software interface to database 103 suitable to that of clients 111. The terms "database" and "database server" are used herein interchangeably.

Figure 3:
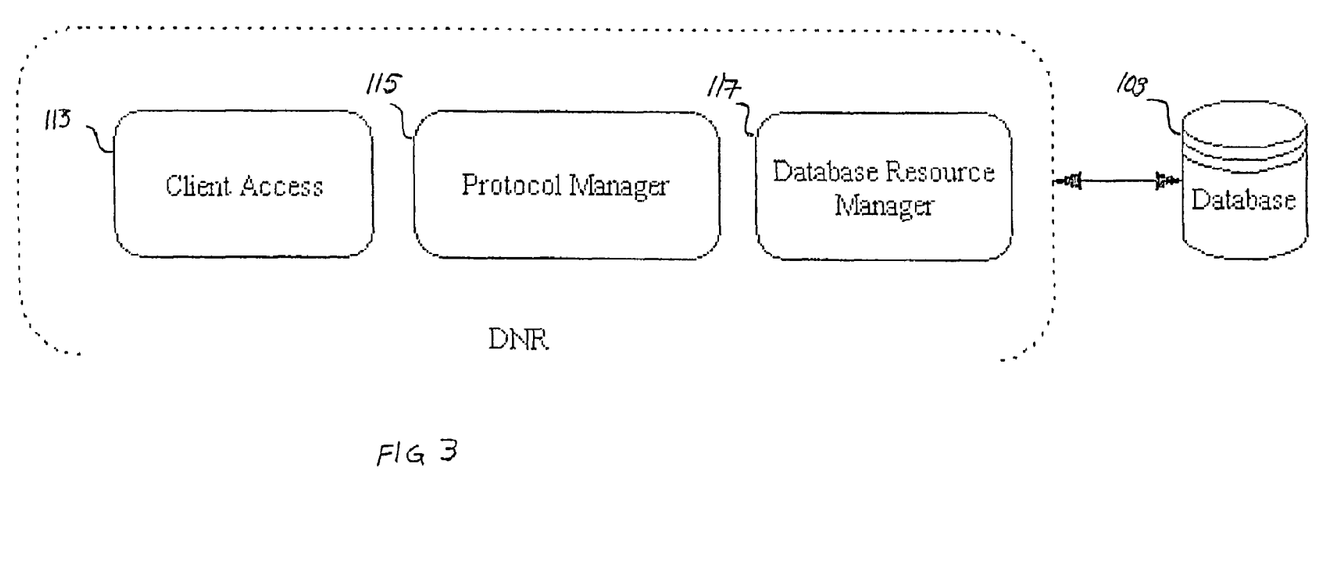
FIG. 3 is a schematic drawing of a system showing the software modules of a DNR in the present invention.

FIG. 3 illustrates three software modules functional as part of DNR 101. A client access module 113 performs the I/O required during database sessions and in the background to and from clients 111. Similarly, a database resource manager 117 performs the read/write operations required during the database session and in the background to and from databases 103. Protocol manager 115 detects for each of clients 111 the database protocol (eg. SQLnet or DBLink) in use and switches to the appropriate software module to handle that protocol. In this way, DNR 101 is transparent to different database protocols in use by simultaneous clients. Not shown in FIG. 3 is a remote administration module which allows the management, including monitor and control, of DNR 101, and the receiving of statistics to an external administrator.

Figure 4:
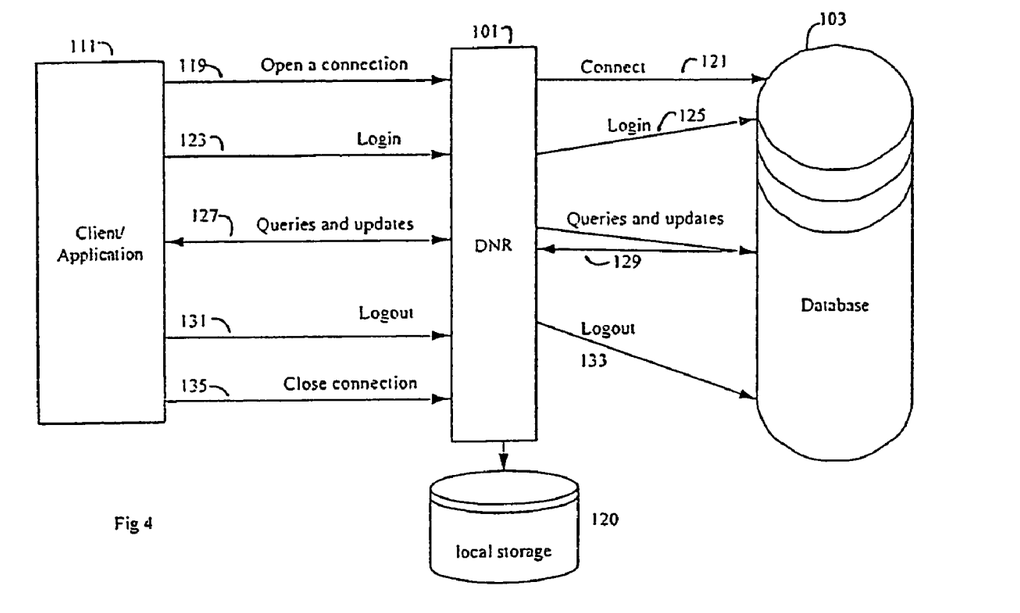
FIG. 4 is a process diagram showing a DNR mediating a session between a client and a database server.

FIG. 4 shows an example of a process during a typical database session as mediated by DNR 101. A client requests to open a connection (step 119). DNR 101 decides to connect (step 121) to the database and the database confirms. The client then requests a log-in (step 123); the log-in is transferred by DNR 101 to database 103 (step 125) and the log-in is confirmed by database 103. During the sessions client 111 sends queries and updates to DNR 101 (step 127). Queries and updates are in turn either passed on to database 103 "as-is" or changed by DNR 101, (step 129). Alternatively, the queries and updates are optionally processed to improve performance. The session ends typically with a log-out request (step 131), log-out to database 103 (step 133) and the connection is closed (step 135). During the session, the local storage 120 is used to log relevant information including the availability of connections.

Figure 5:
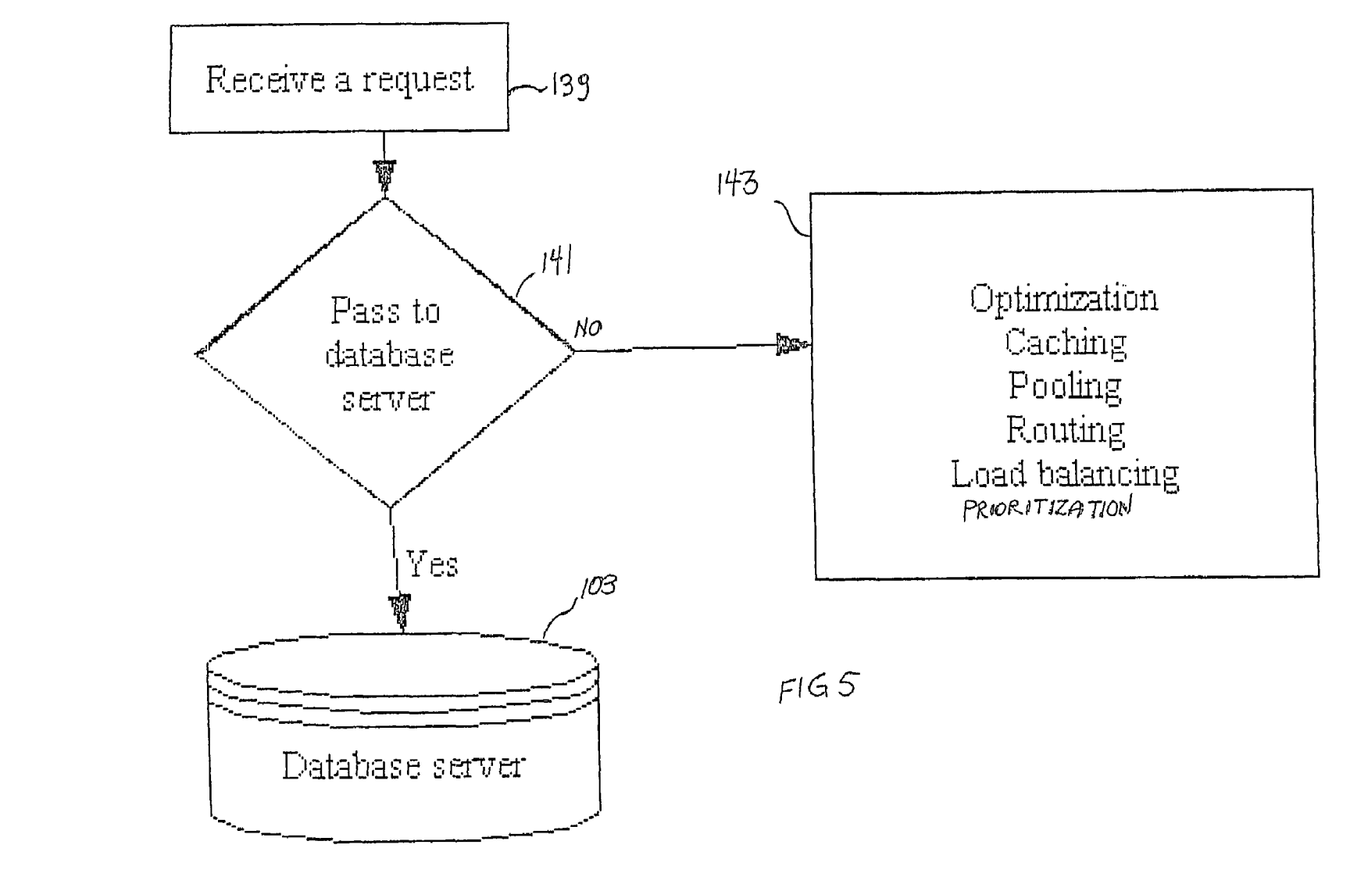
FIG. 5 is a data flow diagram according to an embodiment of the present invention.

FIG. 5 shows the preliminary data flow within DNR 101. A request is received from a client (block 139). A decision is made (block 141) whether to pass the request transparently to database 103 or to process the request (block 143).

Figure 6:
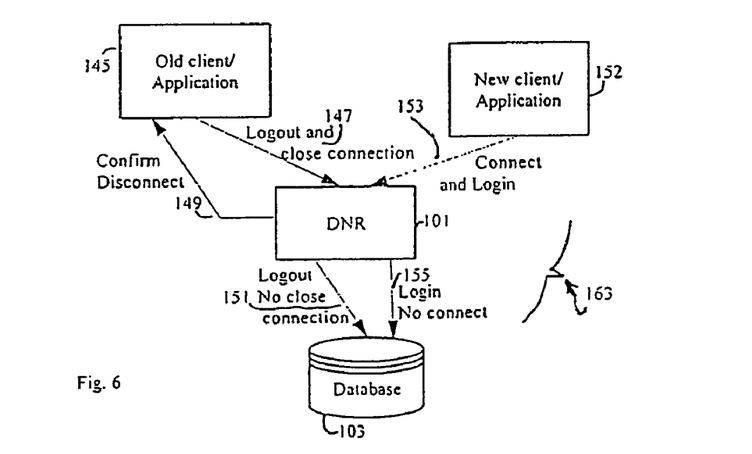
FIG. 6 is a flow chart showing a connection pooling optimization technique according to the present invention.

FIG. 6 illustrates an innovative example of connection pooling 163 in which requests from client 111 are processed and not passed transparently to database 103. A database session is in progress and a client 145 sends log-out and close connection requests (step 147) to DNR 101. DNR 101 processes the requests and sends to database 103, a log-out request but no close connection (step 151). The connection is left open until a new client 152 requests connect and log-in (step 153) from DNR 101. DNR 101 processes the requests and sends log-in but no connect request (step 155) to the data base because the connection was left open from client 145. By leaving the connection open from client 145 and allotting client 152 the open line, DNR 101 saves database CPU time.

Figure 7:
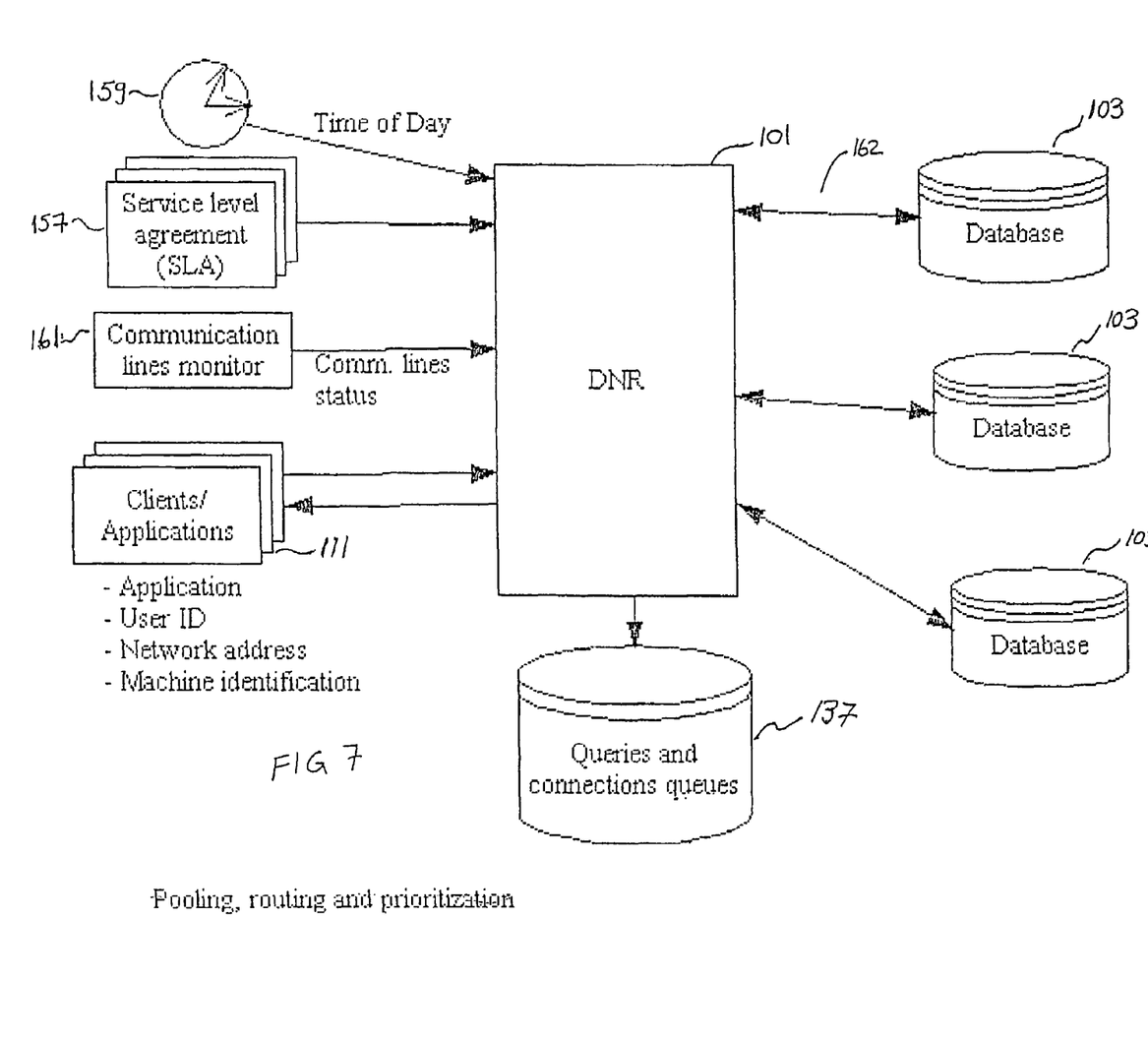
FIG. 7 is a schematic system diagram showing input/output (I/O) to a DNR according to the present invention.

FIG. 7 shows monitoring functions of DNR 101 which enable connection pooling 163, routing and prioritization techniques which are included as an aspect of the present invention. DNR 101 receives status information including communication lines status from a communications line monitor 161. Communications line status enables DNR 101 to pool the open connections between different clients 111. The time of day 159 and day of week, are available to DNR 101 as parameters. As an example, for the use of time of day 159, DNR 101 may pre-open connections to the database servers so that when massive requests are expected, such as at the start of business day, the connections are open and ready. A set of service level agreements 157 provides expected quality of service levels for each session to DNR 101. DNR 101 establishes service priority levels and processes queries accordingly. Status information received from clients 111, when clients 111 connect to DNR 101, includes user ID, application, network address, and machine identification. This information is used by DNR 101 to identify clients 111 and set priority levels. The load of databases 103 is also input to DNR 101 which monitors and receives status (step 162) from database 103. DNR 101 uses this database and client status information to queue accordingly, clients 111 requests for connecting. Furthermore, DNR 101 may transfer queries and updates in already established connection queues to different databases based on algorithms that use this status information.

Figure 8:
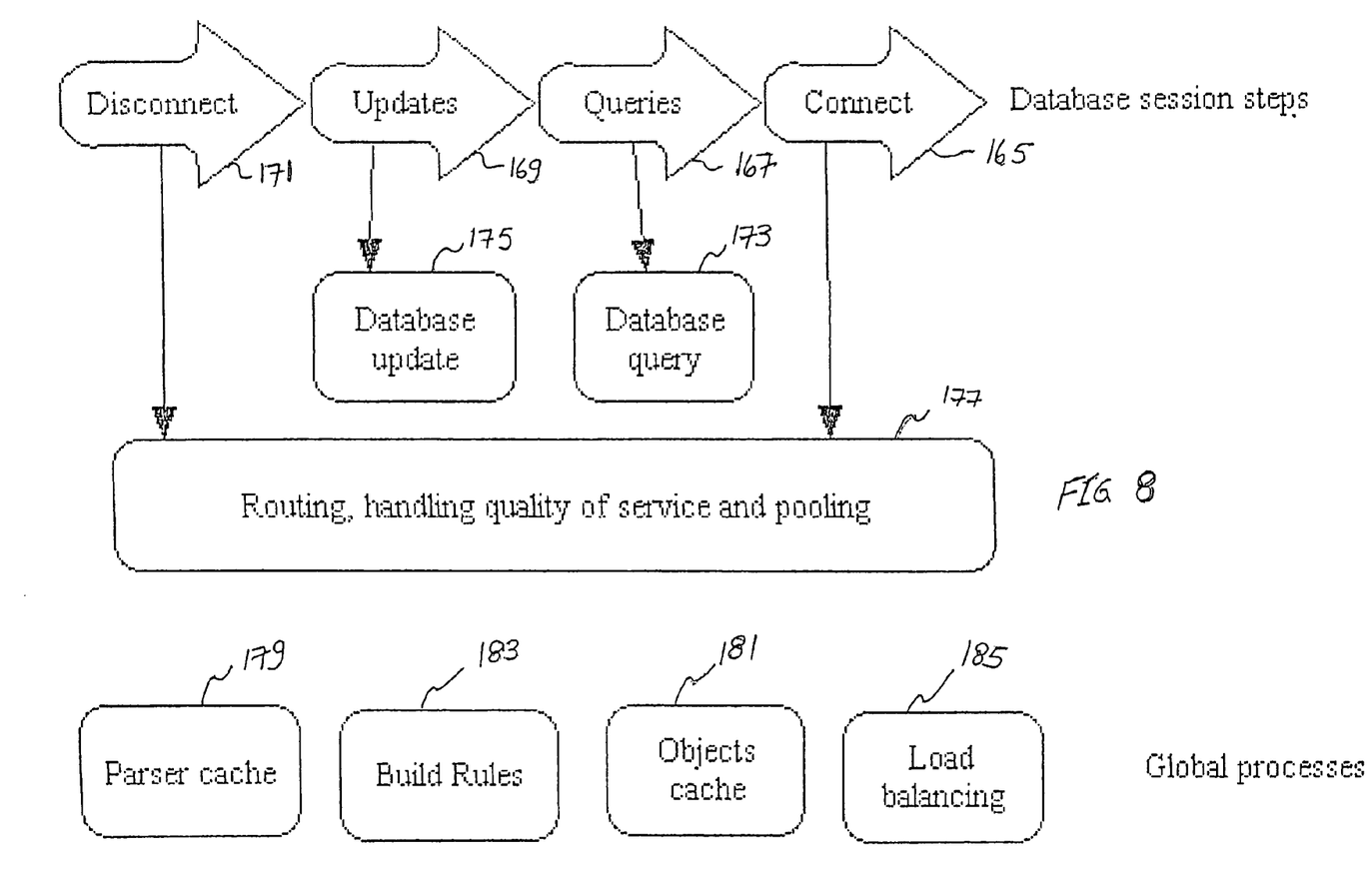
FIG. 8 is a process diagram showing foreground database session processes and global background process as part of a method of the present invention.

FIG. 8 illustrates the processes of data flow in DNR 101, according to the present invention. The processes shown are of two kinds; data session processes and global processes ongoing in the background. The data session processes include connecting 165 in which DNR 101 establishes a connection to a client. The sending of queries 167 and the sending of updates 169 to the database are both processes performed either transparently; or alternatively with processing 177 including routing, quality of service handling, and prioritization. At the end of a database session, close connect process 171 frees the connection. Global processes include storing parser results in a cache 179, storing objects in a cache 181 for user defined and commonly used objects, a process to build and store alternative queries for non-optimized popular queries 183 and a process of load balancing 185.

Figure 9:
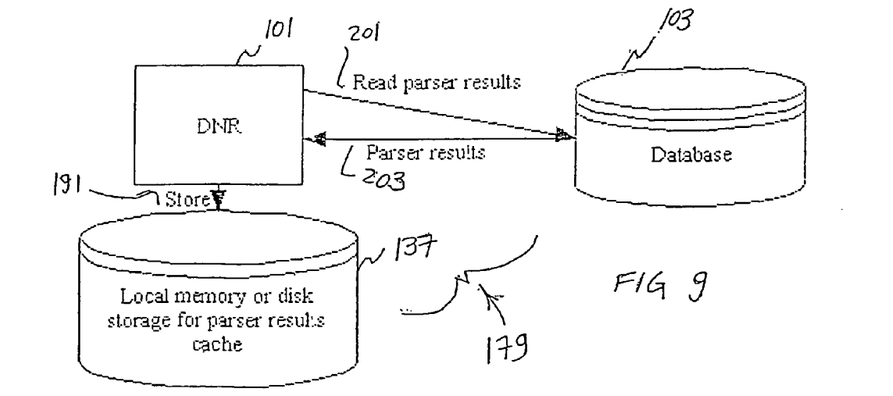
FIG. 9 is a flow diagram of a parser results cache used for optimization according to one aspect of the present invention.

The global process parser results caching 179 is illustrated in detail by FIG. 9. DNR 101 requests parser results (step 201); for a query statement; the parser results (step 203) are received by DNR 101. DNR 101 stores (step 191) the parser results in local cache memory 137. The parsed queries results are then available for future use by DNR 101. DNR 101 may keep the parsed queries results in local storage 137 and purge the parsed queries results according to internal algorithms.

Figure 10:
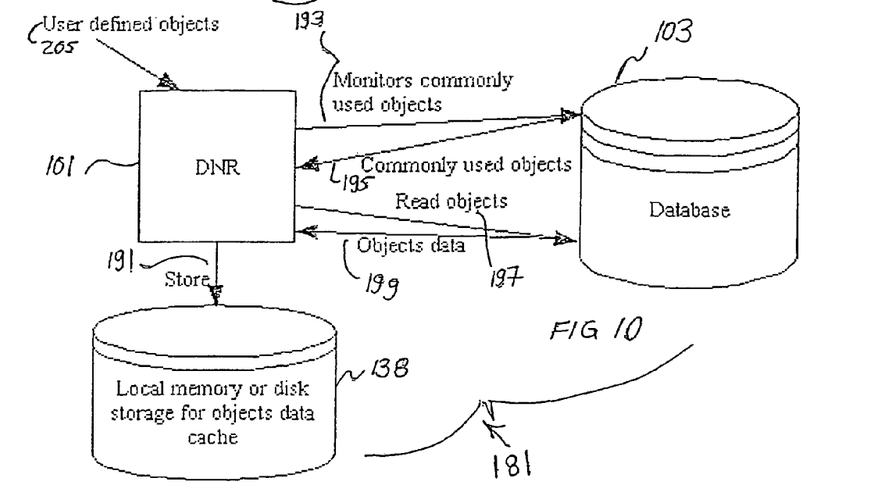
FIG. 10 is a flow diagram of a commonly used objects data cache used for optimization according to one aspect of the present invention.

FIG. 10 illustrates a similar process 181 to store data objects in cache storage. The terms "objects" and "data objects" are used herein interchangeably. Data objects include tables or parts of tables or other data structures. Two kinds of objects are stored (step 191) in local cache memory, commonly used objects 195 and user defined objects 205. When new objects are selected to be cached, the data of the new objects are requested from database 103 (step 197). Objects' data are received (step 199) from database 103 to DNR 101. Mathematical manipulation of the objects is performed if needed by DNR 101 and the objects are stored in local cache memory 138. DNR 101 monitors the objects (step 193) to obtain a log of the most commonly used objects and DNR 101 decides whether to add or purge objects (step 195) from this log.

Figure 11:
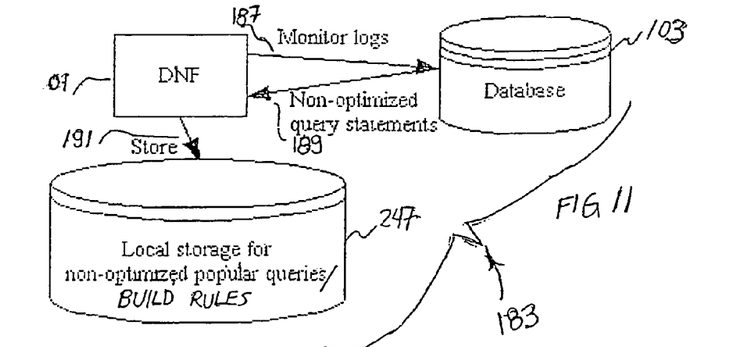
FIG. 11 is a flow diagram of a background process for monitoring and logging non-optimized popular queries, as part of the present invention.

FIG. 11 illustrates the process to store alternatives for non-optimized popular queries. DNR 101 monitors queries (step 187) and logs (step 189) queries that are not optimized. Using known algorithms, previously stored in DNR 101, the best alternatives for these non optimized popular queries are stored (step 191) in local storage 247. These caching processes 179, 181, 183 all improve the performance on the database network by removing load from the database servers.

Figure 12:
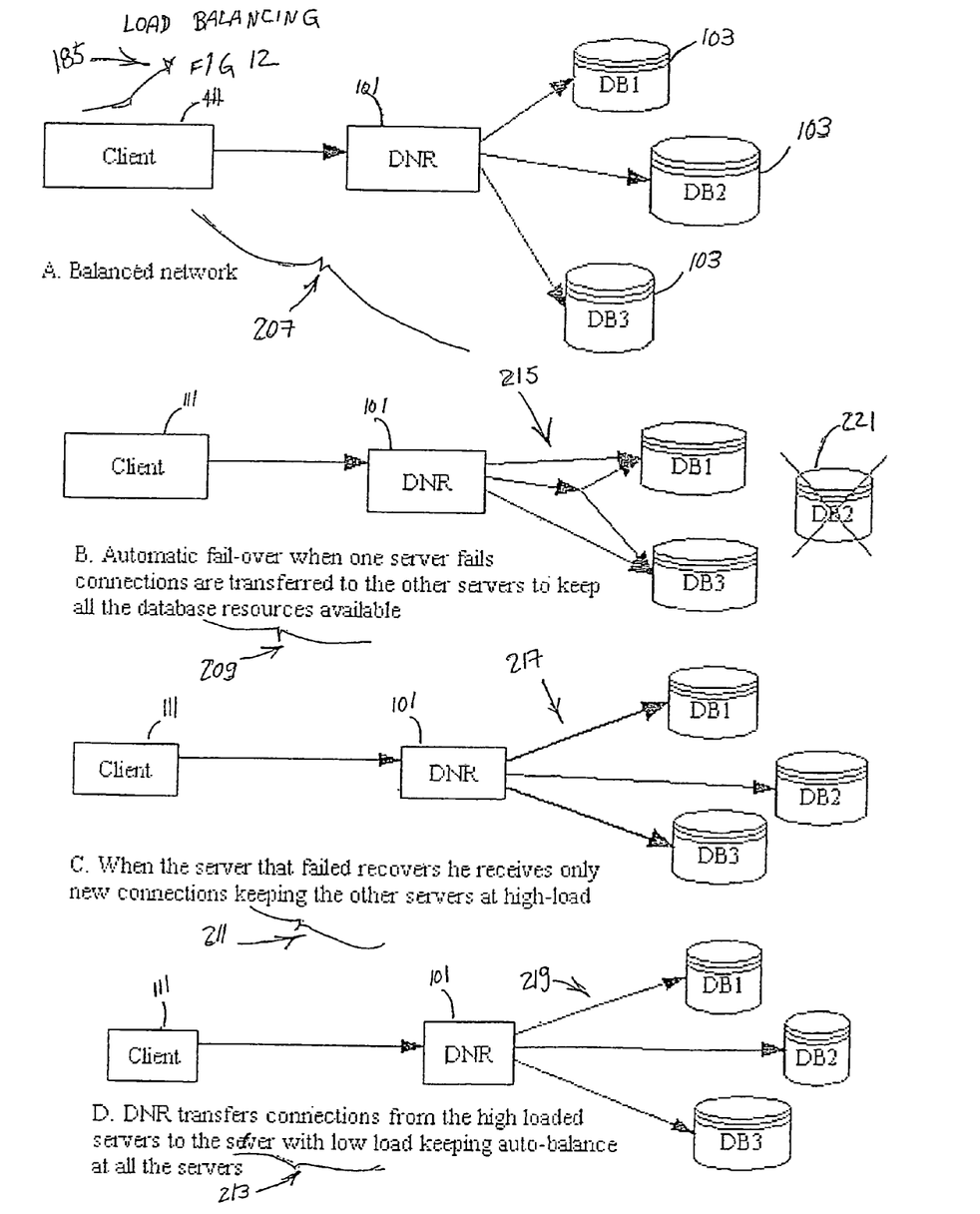
FIG. 12 is a 4-step process showing connection load balancing as a background optimization technique as part of the present invention.

FIG. 12 illustrates another process, known as load balancing 185, which optimizes the data base network by balancing the load on the data base servers. FIG. 8A illustrates a balanced network 207. FIG. 8B shows automatic "failover" 209; the failure of database server 221. Automatic "failover" 209 (the failure of database server 221) and step 215 show the connections to failed database server 221 are transferred to other databases. In FIG. 8C, step 217 shows that when failed server 221 recovers, server 221 receives only new connections, keeping the other servers at high load. FIG. 8D shows that DNR 101 transfers connections (step 219) from the high loaded server to the server with less load, thereby maintaining balance on all the servers.

Figure 13:
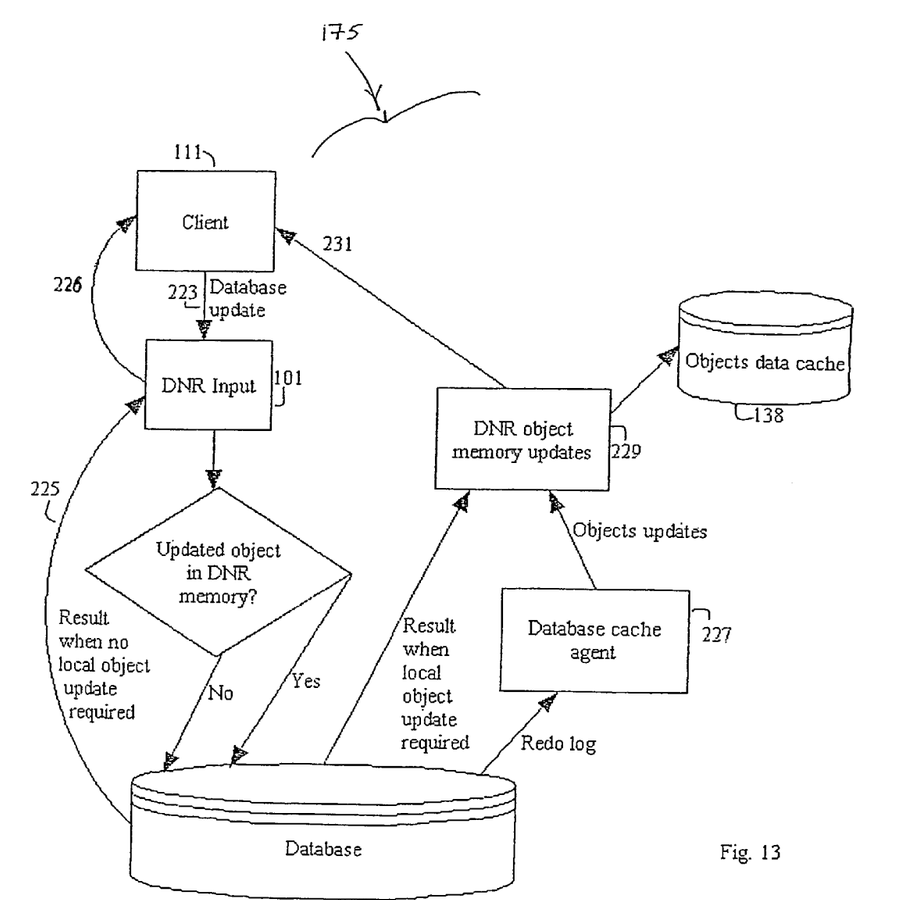
FIG. 13 is a process flow chart showing the database update process as part of the present invention.

FIG. 13 illustrates another innovative synchronization technique as part of database update process 175 of the present invention. Client 111 sends (step 223) a database update to DNR 101. If the updated object is not in DNR 101 local memory then the result (step 225) is sent by database 103 to DNR 101 and then from DNR 101 to a client (step 226). However, if the locally stored object requires updating, then DNR 101 waits until the database cache agent 227 reports to DNR 101 that the data object has been successfully updated in the database and then sends to DNR 101 the updated, relevant data for the object stored in DNR 101. DNR 101 recalculates the object (block 229) and stores the updated object in local storage 138. Only then is a response sent to client 111 (step 231). The database cache agent 227 is triggered by the database server whenever any transaction is completed. With this method, DNR 101 insures data reliability throughout the update process.

Figure 14:
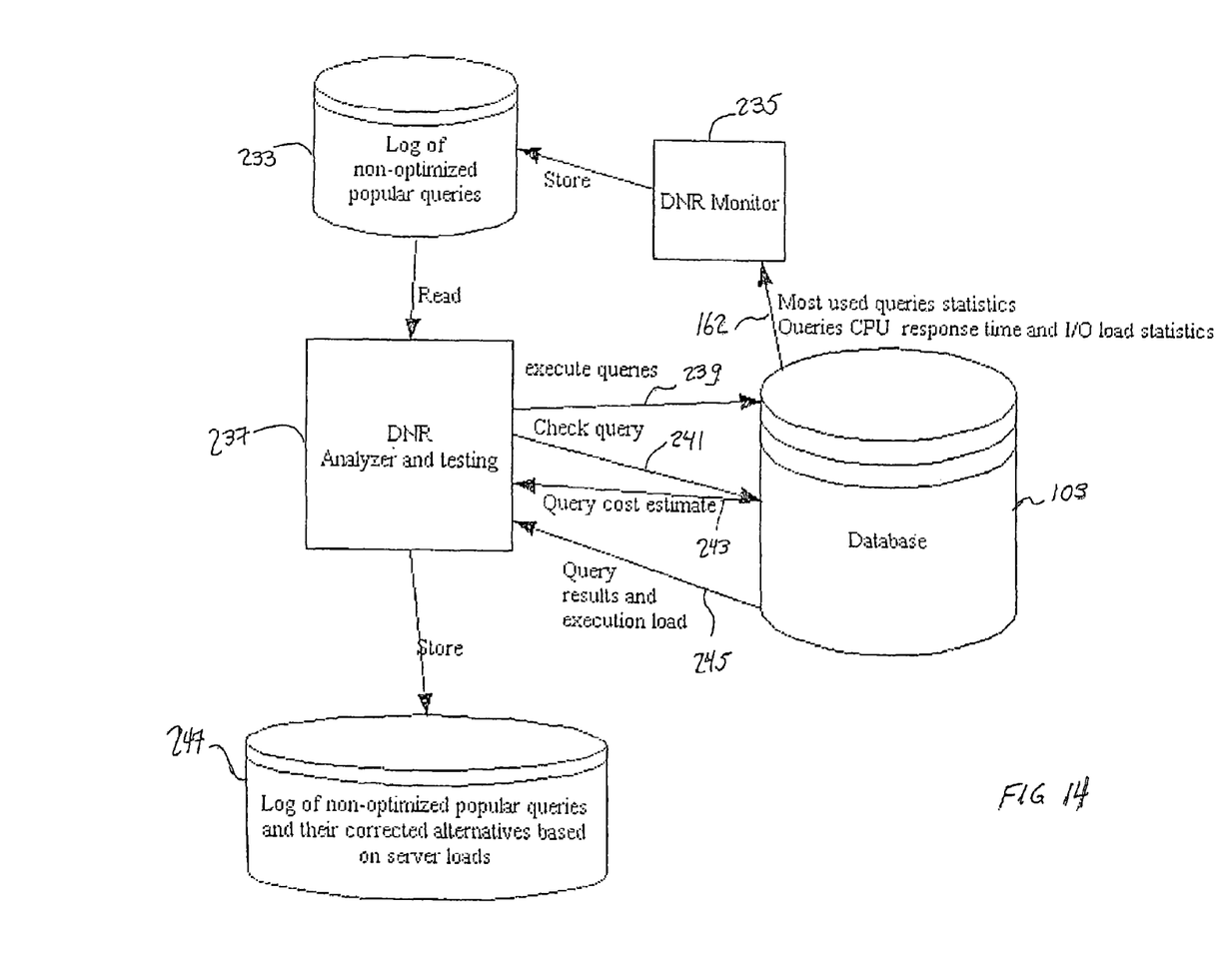
FIG. 14 is a data flow diagram showing the database query process as part of the present invention.

FIG. 14 further illustrates the innovative process 183 used by DNR 101 to analyze and test database queries and store optimized alternatives, according to a preferred embodiment of this invention. DNR 101 analyzer and testing module 237 checks queries (step 241) to receive query cost estimates (step 243). DNR 101 executes queries (step 239) and receives actual query results and execution loads (step 245). The queries' load statistics, including CPU time, response time and read/write load statistics, are received by DNR monitor 235, which is optionally installed in part on database server 103. DNR monitor 235 stores in local storage 233 a log of non-optimized popular queries. DNR analyzer 237 reads from the log of non-optimized queries 233 and determines corrected alternatives based on database 103 loads and stores these alternatives for future use in local storage 247.

Figure 15:
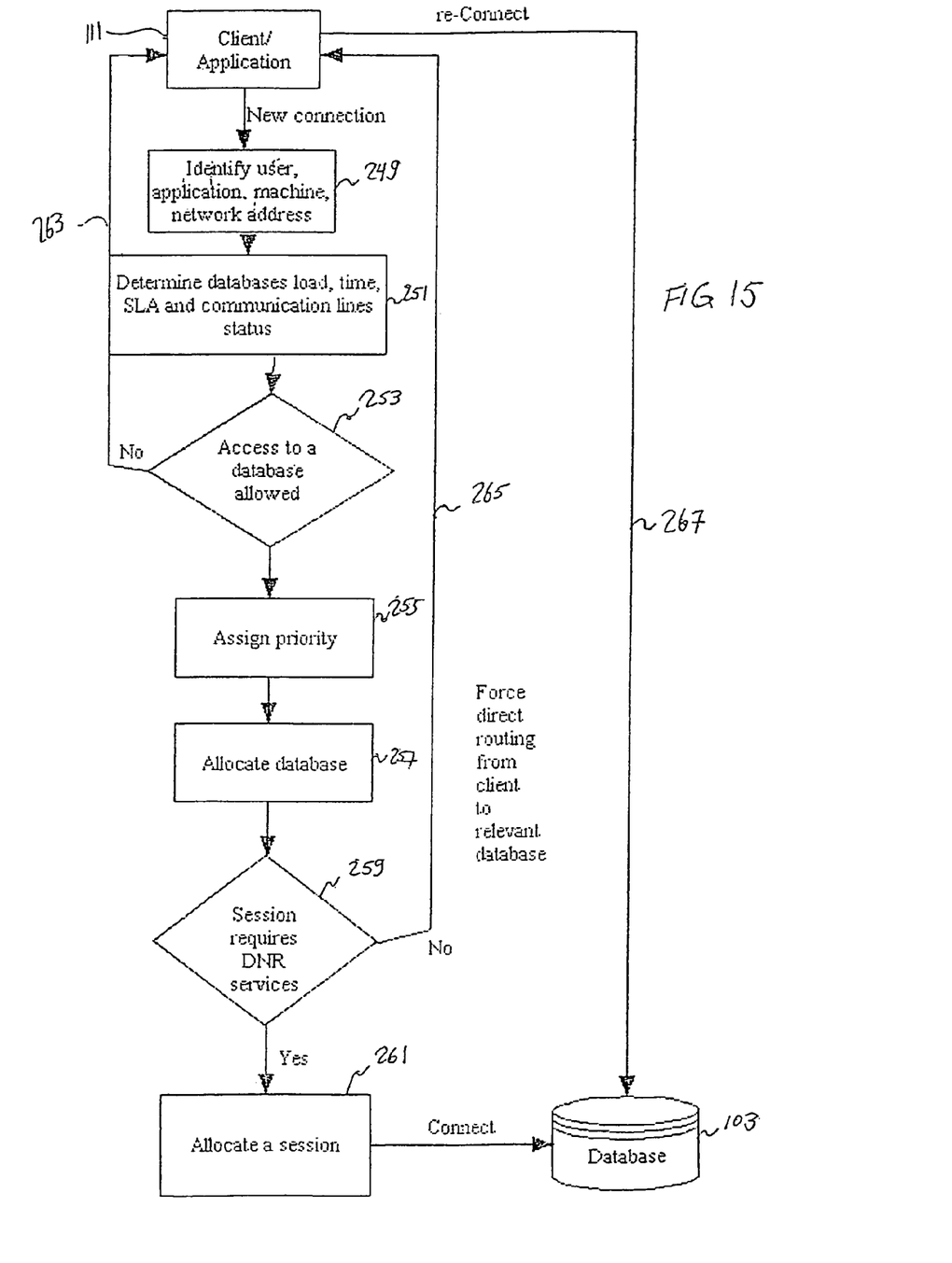
FIG. 15 is a flow diagram showing the routing process as part of the present invention.

FIG. 15 illustrates a process, as part of the present invention, for routing connections and assigning priority. DNR 101 has the capability to receive a request for a connection from client 111 to database 103 and decide whether to transfer the request to a specific database or to modify the request considering the application, the user or group of users, specific network IP or network segment or domain, specific machine or group of machines. In FIG. 15, client 111 requests a new connection. Client 111 is identified according to parameters including user, application, machine type and network address. In block 251, DNR 101 checks parameters, including the requested database load, the time of day, the service level agreement and communications line status. The access to database 103 is either allowed or disallowed, (block 253). If access is disallowed, an error message is sent (step 263) in response to the client 111. If access is allowed, priority is assigned to the client (step 255), and a database is allocated (step 257). If no further DNR 101 services are required, then routing is achieved directly to the relevant database (step 265); else if DNR services are required then DNR 101 mediates the session (block 261). When DNR 101 services are not required during the session, then DNR 101 sends a message to client 111 to reconnect to a database server 103. The client 111 connects (step 267) and establishes a session with database server 103.

Figure 16:
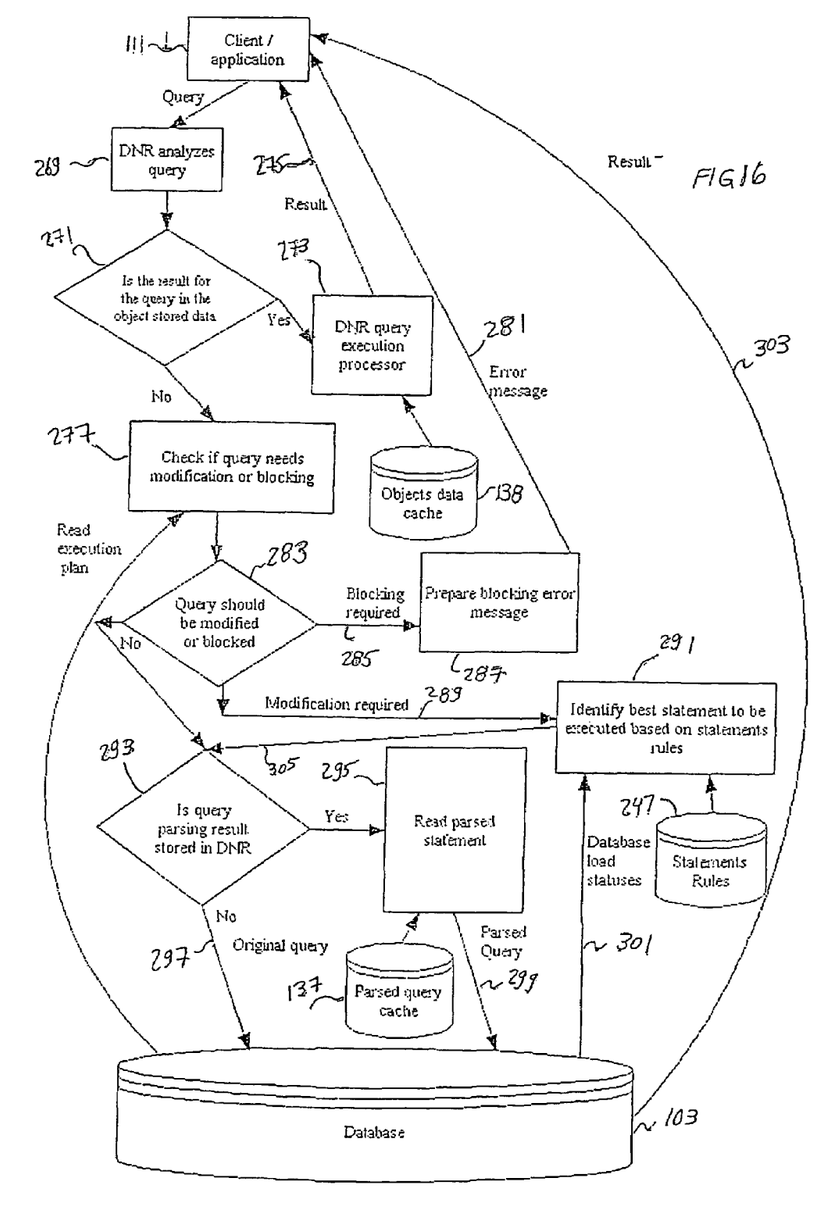
FIG. 16 is a flow chart of the database query process showing an embodiment of the present invention.

FIG. 16 is a flowchart of a database query process 173 in accordance with a preferred embodiment of the present invention. Client 111 sends a query. DNR 101 analyzes the query (block 269). If the result for the query is in the object stored data, (decision block 271) then DNR query execution processor 273 retrieves the object from the local objects data cache 138 and the result 275 is returned to client 111. If the object is not locally available (decision block 271) DNR 101 checks if the query needs modification or blocking. (decision block 277). If no modification of the query or blocking is required (decision block 283), then DNR 101 checks if the query parsing result is stored in DNR 101 (decision block 293). If the query parsing result is stored in DNR 101, the parsed statement is read (block 295) from the local parsed query cache 137. The parsed query is then passed on to database 103. However, if blocking of the query is required (step 285) then DNR module 287 prepares a blocking error message (step 281) which is returned to client 111. If the query requires modification (step 289), then DNR module 291 identifies the best statement to be executed based on statement rules stored in local storage 247. The optimized statement 305 is checked by DNR module 293 if the parsing result of the now modified statement is stored and if the parsing result is not stored, the original query is transferred (step 297) to database 103.

Figure 17:
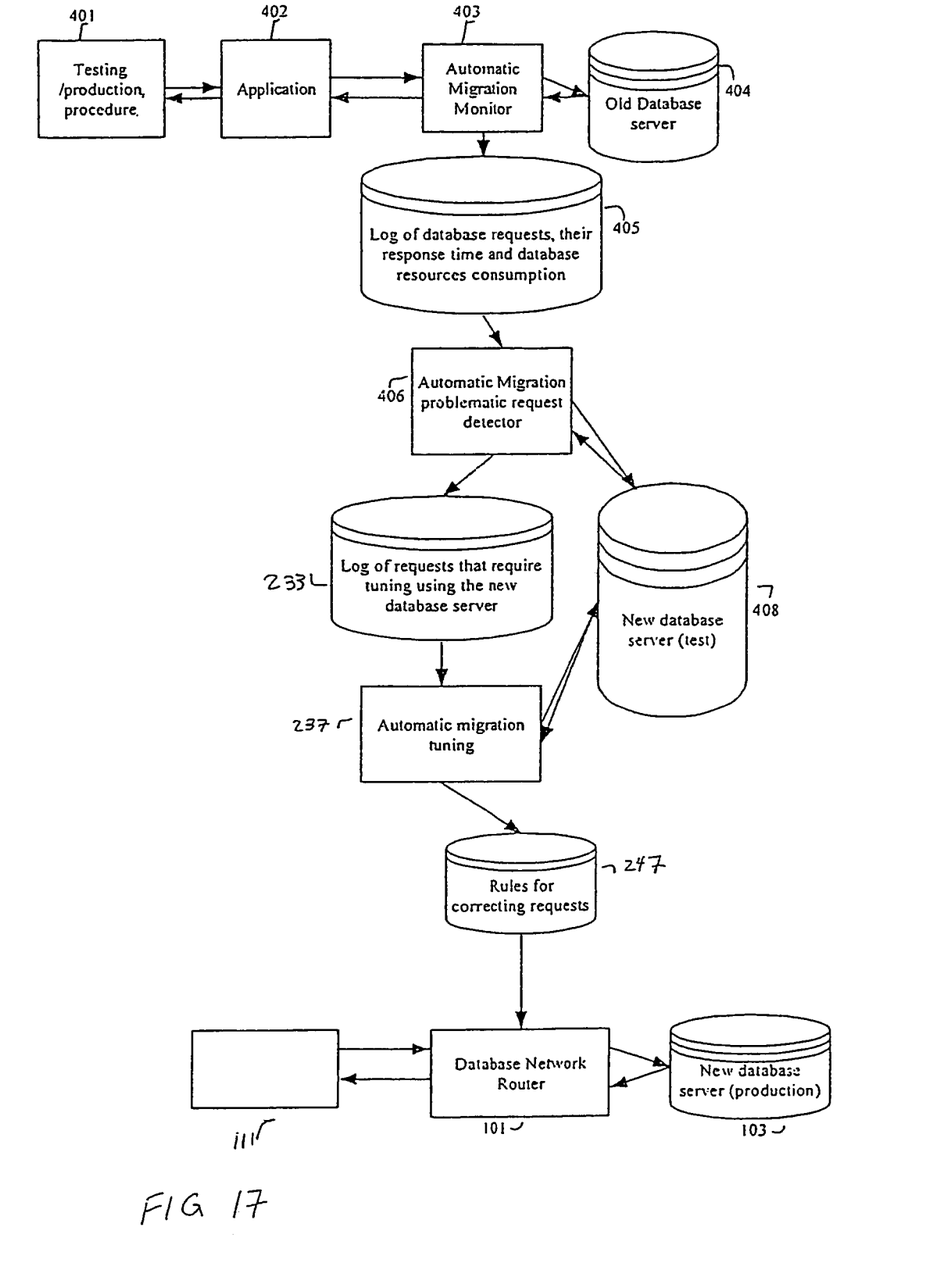
FIG. 17 is a flow chart of the migration process from an old database server to a new database server.

FIG. 17 shows in accordance with the present invention, migration from working with an old database server 404 to a new database server 103. A testing or production procedure 401 invokes an application 402 that requires the migration. Application 402 issues database requests and updates to the automatic migration monitor 403 which is configured as the primary database server to application 402 and as a client to old database server 404. Automatic migration monitor 403 receives the replies from old database server 404. Automatic migration monitor 403 also receives from old database server 404 the load of each communication. The scope of the term "communication" as used herein includes database query, database update, database response, database results and/or database message. Automatic migration monitor 403 also measures the response time of the query. The queries and their respective loads, (eg. resources consumption and the response time) are stored in local storage 405. Upon completion of storing all the database requests and their associated loads in local storage 405, automatic migration problematic request detector 406 is executed. Automatic migration problematic request detector 406 reads the storage 405 of all the database requests and their associated response time and resources consumption and executes each of the requests against new database server 408. The requests that receive slow replies or consume more resources when running against new database server 408 compared to old database server 404 are stored in a log 233 of requests that require tuning using new database server 408. Automatic migration tuning 237 reads log of requests 233 that require tuning using new database server 407, and for each request stored in log 233 tries different alternatives until the best alternative is found and stored in rules for correcting requests 247. After completing rules for correcting requests 247, the results are imported to DNR 101 and then each statement that comes from client 111 is checked by DNR 101 on its way to the new database server 103. If changes are required, according to rules 247, the statement is changed and the new statement is transferred to database server 103.

While the invention has been described with respect to a limited number of embodiments, it will be appreciated that many variations, modifications and other applications of the invention may be made.

What is claimed is:

1. A system for optimization of database access in a database network comprising:
   (a) at least one client:
   (b) at least one database server; and
   (c) a database network router for managing data flow between said at least one client and said at least one database server, wherein said database network router includes:

(i) a client access module for communicating with said at least one client, and
(ii) a database resource manager for communicating with said at least one database server;
whereby said database network router may be used to optimize access to said at least one database server b said at least one client.

2. The system of claim 1, wherein said client access module and said database resource manager share a common software interface for said communicating.

3. The system of claim 2, wherein said software interface comprises a protocol manager for handling multiple database protocols.

4. The system of claim 1, further comprising:
(iii) local data storage, wherein said database resource manager stores local data.

5. The system of claim 4, wherein said local data is chosen from the group consisting of commonly used data objects, results of parsed query statements, non-optimized query statements, alternatives for said non-optimized query statements, user defined objects and performance statistics.

6. The system of claim 1, wherein a portion of said database resource manager is installed as a database server agent.

7. A method for optimization of database access in a database network comprising the steps of:
(a) providing a database network router: and
(b) using said database network router for managing data flow between at least one client and at least one database server in the database network, wherein the step of using said database network router includes:
(i) receiving at least one client communication,
(ii) sending said at least one client communication to said at least one database server, and
(iii) in response to said at least one client communication, receiving at least one database communication and sending said at least one database communication to said at least one client.

8. The method of claim 7, wherein said at least one client communication is selected from the group consisting of database queries and updates and wherein said at least one database communication is selected from the group consisting of database responses and data.

9. The method of claim 7, wherein the step of using said database network router further includes,
(iv) prior to said receiving, assigning a priority to each said at least one client communication, and
(v) performing (i)-(iii) according to said priority.

10. The method of claim 7, wherein the step of using said database network router further includes, prior to said assigning:
(vi) identifying said at least one client, and
(vii) receiving status information selected from the group consisting of a load of said at least one database server, a time of day of said assigning, a day of week of said assigning, a service level of said at least one client, and a status of at least one communications line between said at least one client and said at least one database server.

11. The method of claim 7, wherein said at least one client communication includes a query and wherein the step of using said database network router further includes, prior to said sending, at least one action selected from the group consisting of analyzing said query, modifying said query, checking a cost estimate of said query, parsing said query and storing said query in a local storage.

12. The method of claim 11, wherein said modifying of said query includes blocking of said query, and wherein said at least one database communication includes an error message.

13. The method of claim 7, wherein the step of using said database network router includes:
(i) receiving a log-out and disconnect request from a first client that is initially connected to one of said at least one database server by a database connection, and
(ii) reporting said log-out to said one database server while leaving said database connection available for a second client.

14. The method of claim 13, wherein the step of using said database network router further includes:
(iii) receiving a log-in and connection request from said second client;
(iv) reporting said log-in to said database server; and
(v) using said database connection for said second client.

15. The method of claim 14, wherein the step of using said database network router further includes: prior to said reporting:
(vi) responding to said first client log-out and disconnect request with a message confirming log-out and disconnect.

16. The method of claim 14, wherein the step of using said database network router includes:
(i) sending at least one query to one of the database servers; and
(ii) monitoring a processing of said at least one query by said one database server, said monitoring including receiving information, regarding said at least one query, selected from the group consisting of a CPU time of said database server, a response time of said database server, a read/write load of said database server and an execution load of said database server.

17. The method of claim 16, wherein the step of using said database network router further includes: (iii) subsequent to said receiving, storing said queries in a log of popular non-optimized queries.

18. The method of claim 17, wherein the step of using said database network router further includes: (iv) reading said queries from said log.

19. The method of claim 18, wherein the step of using said database network router further includes: (v) analyzing and testing said queries.

20. The method of claim 19, wherein the step of using said database network router further includes: (vi) building optimized alternatives for said queries.

21. A method of load balancing in a database network that includes a plurality of database servers, comprising the steps of:
(a) providing a database network router
(b) detecting a failed one of the database servers; and
(c) using said database network router for transferring connections of said failed database server to at least one other server, wherein the step of using said database network router includes:
(i) monitoring said failed database server for a recovery thereof, and
(ii) transferring at least one new connection to said failed database after said recovery.

* * * * *

UNITED STATES PATENT AND TRADEMARK OFFICE
CERTIFICATE OF CORRECTION

PATENT NO. : 7,676,516 B2  Page 1 of 1
APPLICATION NO. : 10/531205
DATED : March 9, 2010
INVENTOR(S) : Eric Boukobza

It is certified that error appears in the above-identified patent and that said Letters Patent is hereby corrected as shown below:

Claim 1, column 9 line 6 should be corrected as follows:
change
"whereby said database network router may be used to optimize access to said at least one database server b said at least one client."
to
"whereby said database network router may be used to optimize access to said at least one database sewer by said at least one client."

Signed and Sealed this

Eighteenth Day of May, 2010

David J. Kappos
*Director of the United States Patent and Trademark Office*